Nov. 24, 1964   S. BERNSTEIN   3,158,744
FLAW DETECTION APPARATUS USING TWO DETECTORS TO
ASSURE UNBALANCE IN A COMPARISON CIRCUIT
Filed April 21, 1961   4 Sheets-Sheet 1
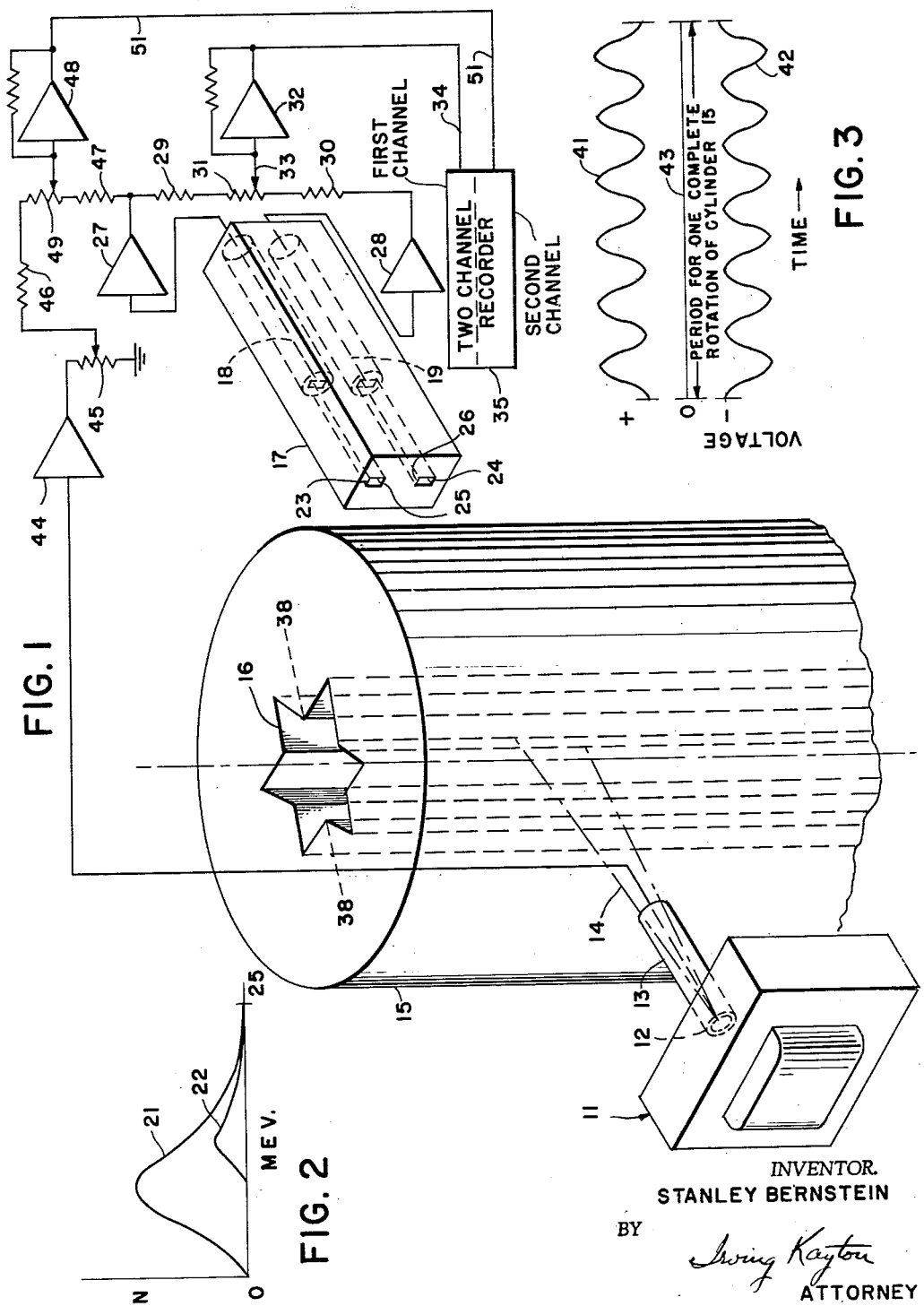
INVENTOR.
STANLEY BERNSTEIN
BY
Irving Kayton
ATTORNEY Nov. 24, 1964 S. BERNSTEIN 3,158,744
FLAW DETECTION APPARATUS USING TWO DETECTORS TO
ASSURE UNBALANCE IN A COMPARISON CIRCUIT
Filed April 21, 1961 4 Sheets-Sheet 2
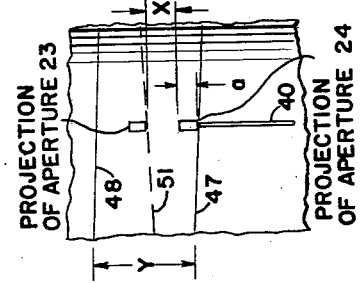
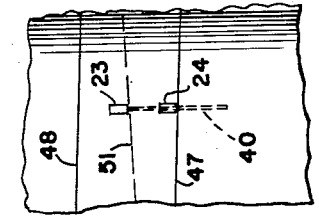
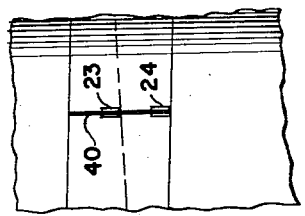
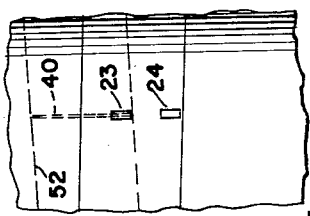
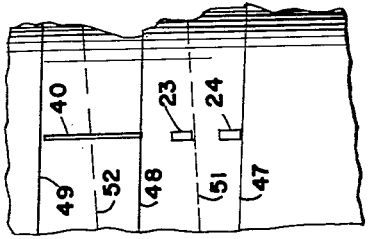
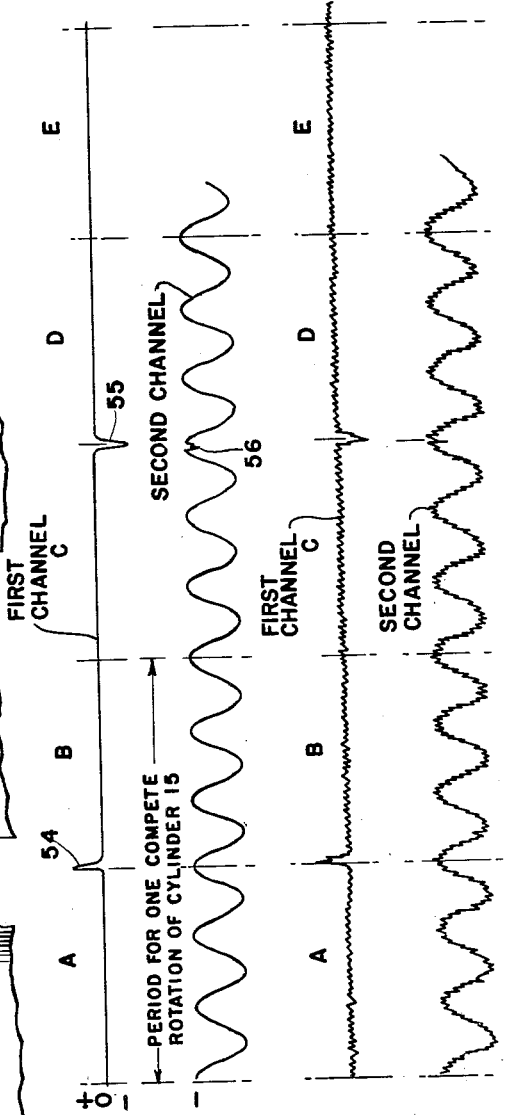
INVENTOR.
STANLEY BERNSTEIN
BY
*Irving Kayton*
ATTORNEY Nov. 24, 1964 S. BERNSTEIN 3,158,744
FLAW DETECTION APPARATUS USING TWO DETECTORS TO
ASSURE UNBALANCE IN A COMPARISON CIRCUIT
Filed April 21, 1961 4 Sheets-Sheet 3

INVENTOR.
STANLEY BERNSTEIN
BY
Irving Kayton
ATTORNEY

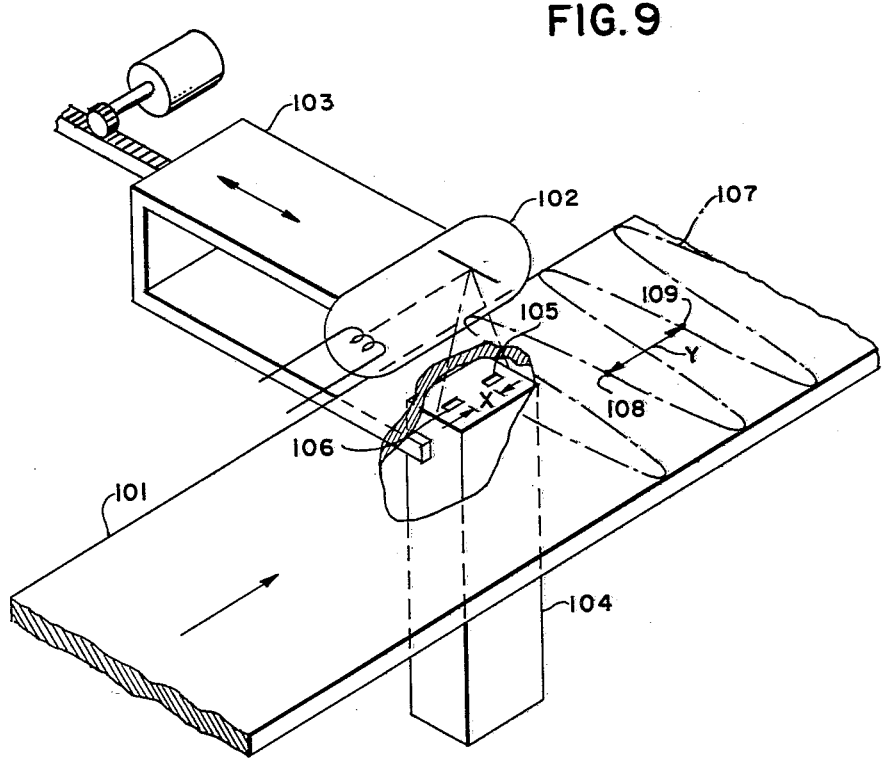

United States Patent Office 3,158,744
Patented Nov. 24, 1964

3,158,744
FLAW DETECTION APPARATUS USING TWO DE-
TECTORS TO ASSURE UNBALANCE IN A COM-
PARISON CIRCUIT
Stanley Bernstein, Milwaukee, Wis., assignor to General
Electric Company, a corporation of New York
Filed Apr. 21, 1961, Ser. No. 104,649
5 Claims. (Cl. 250—83.6)

This invention relates to penetrating ray apparatus and method of using such apparatus for detecting both large and small physical flaws in objects of interest, and particularly for unambiguously detecting those flaws with data derived from the apparatus and by the method.

It is known in the art to utilize two relatively closely spaced X-ray detectors (or gamma ray, or infra-red or optical frequency ray detectors) for the purpose of ascertaining whether an object in the form of a sheet of metal or the like has disposed therein flaws in the form of slits, cracks, holes, internal or surface pits, or other undesirable structural characteristics such as non-uniform density or thickness. The two detectors, which receive rays from a source after the rays pass through the object under inspection, have their outputs combined in a comparison or difference network. The detectors and output network are balanced relative to each other such that there is ordinarily a null indication from the difference network. However, when a flaw in the object passes in front of one of the detectors, an imbalance results in the amount of penetrating ray energy which reaches the two detectors, with the concomitant result of an imbalance in the output of the two detectors. In such an arrangement, this imbalance, and therefore the variation from the null reading that ordinarily obtains, indicates that some kind of flaw exists. In short, when one of the detectors views something different from that simultaneously being viewed by the other detector, an output signal is generated in the comparison network. The sign or polarity of the signal indicates which of the two detectors has viewed the change.

If the flaw is long or large enough, however, both of the detectors may view the flaw simultaneously. Under such circumstances, each detector will have an output signal which may be the same as that of the other and the net output from the comparison circuit remains a null indication. Thus, if the flaw is sufficiently large and of appropriate shape relative to the arrangement of the detectors, it may be viewed simultaneously by both detectors, and the flaw may pass the apparatus without any indication that a flaw exists. If the two detectors are spaced widely apart so as to insure that only inordinately large flaws can be simultaneously viewed by the detectors, a disadvantage develops in that the large spacing between the two detectors will permit many relatively small flaws to go by undetected.

In the inspection system described, the motion of the test object in passing before the detectors, i.e., the scanning pattern and the shape of the test object, is relatively simple. Thus, if an object such as a sheet of metal or other object with a uniform, relatively non-varying transverse cross-section is passed with translational motion in only one direction in front of the two detectors, reasonably satisfactory results can be achieved, since the lead edge of the large flaw will almost invariably cover one of the detectors before the flaw can subsequently simultaneously cover both of the detectors. Once this happens, at least some kind of imbalance in the circuit develops, indicating at least some kind of a flaw, despite the subsequent null indication that appears when the flaw is viewed simultaneously by both detectors.

In the detection of flaws in either complicated or large objects, the inspection scanning pattern used must of necessity be more complicated than one resulting from a simple uni-directional translational motion of the test object. Otherwise, the full volume or area of the test object may not be completely scanned. With a more complicated scan pattern, flaws (a class of them) exist which, because they are long relative to the inter-detector spacing and are positioned or shaped appropriately relative to the detectors and scan pattern, cause the undesirable situation wherein one detector cannot view the flaw at any time without the other detector simultaneously viewing it. With respect to this class of flaws, the comparison network would steadfastly maintain its null indication throughout the entire process, and the flaw would go undetected.

Some help for this problem may be obtained by examining the output of solely one of the detectors (either one) at the same time as the output of the comparison network is examined. Even though the comparison network will maintain its null indication, the single detector output should show some change in output signal level as the flaw comes into its view. In a practical situation, however, the flaw may be, and often will be, a relatively shallow and narrow crack, so that the change in the signal level output from the single detector may be too slight for the viewer to have any confidence that it is not merely due to externally or internally generated noise in the system.

Thus, in the prior art detection systems there is a class of flaws which, because of its geometrical relationship to the arrangement of the detectors and the scanning pattern, can, and does, go undetected. These flaws have in common, at least, the qualities of being relatively long (i.e., relative to the distance between detectors), and quite shallow (i.e., in the direction measured from the ray source to the detectors).

There are certain applications of flaw detection systems where the undetected passage of long, shallow flaws may not be of much moment. There are other applications for flaw detection systems wherein the undetected passage of such flaws would have catastrophic results. Consider, for example, a flaw detection system utilized for inspecting the solid fuel motor portion of intercontinental ballistic missiles and related types of solid fuel missiles such as the "Minuteman" and "Polaris" missiles. The motor section of such missiles comprises a right cylindrical section some twenty feet in length and five feet in diameter. If a flaw detection system for inspecting such an object where to permit a substantial number of long, although shallow or narrow, internal slits or fissures to go undetected, the result would be the loss of hundreds of thousands, if not millions, of dollars for each missile that would have to be destroyed in flight because of improper functioning of the solid fuel motor ( and such improper functioning may well result from the failure to detect such a flaw in the motor section). The dangers to human life resulting from such faulty firings, and the possible failure to achieve the expected military advantage cannot even be measured in tangible terms, nor could our loss of international prestige, nor the neutralization of the aggression deterring value of our missiles, which would surely result from a high incidence of faulty or unsuccessful missile launchings.

It is the primary object of this invention, therefore, to provide a penetrating ray flaw detection system capable of detecting substantially all classes of physical flaws in an object under inspection, within acceptable probability limits.

It is another object of this invention to provide X-ray flaw detection apparatus which can reliably detect flaws in, and on, solid objects, which flaws are relatively small compared to the spacing between the two detectors of the system, and which also can reliably detect flaws which are relatively large compared to that spacing and shallow compared to the noise level characteristic of the detection system.

The above objects have been achieved in accordance with the principles of the invention by means and method for controlling the motion described by, and the distance traveled by, the test object in a special way relative to the inter-detector spacing. These means and method insure that no flaw can go undetected merely because the flaw intercepts the field of view of both detectors simultaneously, since they guarantee that at some time that same flaw will intercept the field of view of solely one of the detectors and thereby cause an imbalance in the comparison circuit.

Considering one embodiment, to be described in greater detail below, wherein a solid fuel rocket motor section is the test object under consideration, the motor section may be moved both translationally and rotationally across, or relative to, the fields of view of the two detectors. Although many inspection or scanning patterns may be devised by different combinations of such translational and rotational motion relative to the spacing of the detectors, one particularly useful scanning pattern involves a translational component of motion parallel to a line connecting the midpoints of the two detectors (two-detector line) and a rotational component of motion in a plane perpendicular to the two-detector line. In such a pattern, a point projected from one of the detectors on to the surface of the right cylindrical object describes a helix thereon as a result of the combined rotational and translational motion of the cylinder relative to the detectors.

In accordance with the principles of the invention, the distance "X" between the two most closely adjacent edges of the fields of view of the detectors projected onto the surface of the cylindrical test object (inter-detector distance), and the length "a" of the field of view of one of the detectors in the direction parallel to the inter-detector distance, determine the maximum permissible magnitude for the pitch of the scanning pattern helix described on the cylinder surface, i.e., the pitch "Y" of the helix must be less than or equal to twice $(X+a)$. Thus, for every complete rotation of the cylinder, the cylinder travels a distance "Y" parallel to its longitudinal axis (and therefore parallel to the two-detector line) which is less than or equal to the distance $2(X+a)$. This insures, as will be seen, that no flaw anywhere on or within the cylinder can simultaneously intercept the fields of view of both detectors, without first having been solely within the field of view of one of the detectors.

Means may be provided for recording the output of solely one of the detectors simultaneously with the differential output from both the detectors, to help insure that a large, shallow flaw will not go undetected. For example, suppose that on the output from the single detector, there appears a variation in the signal level which seems to be, but is not clearly, more than that which could be attributed to noise. Immediately, then, the output of the comparison or differential network is examined to see if it verifies the existence of a flaw. If there is, in fact, a large, shallow flaw, an imbalance in the comparison network should develop when the leading edge of the large flaw covers the first detector and should disappear when the flaw covers both detectors.

From a practical point of view, the invention renders unnecessary the monitoring of solely one detector. Since the differential output itself will never permit a large flaw to pass without some indication that a flaw exists, in accordance with the principles of the invention, it may be seen that monitoring the single detector provides little information that is not redundant. In the normal procedure for inspection of solid fuel missile motors, once the flaw detection system indicates any signal other than a null, an X-ray picture or radiograph is taken to ascertain the precise nature of the flaw. The decision is then made as to whether or not the flaw is of an acceptable nature.

It is a feature of the invention, therefore, that a test object is moved relative to two penetrating ray detectors to provide a component of motion parallel to an imaginary line connecting the two detectors (two-detector line), and a cyclic component of motion in a plane perpendicular to the two-detector line, such that the parallel component of motion has a magnitude less than or equal to twice the sum of the distance between the most closely adjacent edges of the fields of view of the two detectors during any one cycle defined by the cyclic component of motion, and the length of the field of view in the direction of the two-detector line.

It is another feature of the invention that in the inspection of a cylindrical object, the cylinder is moved translationally and rotationally relative to two detectors such that a helix is described on the surface of the cylinder by a point projected on to the surface of the cylinder from one of the detectors, and that means is provided to insure that the pitch of the helix is less than or equal to twice the sum of distance between the two most closely adjacent edges of the fields of view formed on the cylinder by the two detectors, and the length of the field of view in the same direction.

The detection of flaws in certain large objects such as, for example, the cylindrical solid fuel motor section of the missiles mentioned above, is further complicated by complex internal void geometries that are characteristic of the internal configuration of the object and normally occur therein. For example, in the motor section of the missile, a large six-pointed star aperture, or hollow, passes through the entire longitudinal extent of the cylinder, such that at any transverse cross-section along the cylinder, an aperture in the form of a six-pointed star may be seen. It is obvious that detecting a small flaw in the form of a thin slit or pit in such an object, which normally and desirably has large internal variations in its cross-sectional shape, is exceedingly difficult.

It is an additional object of this invention, therefore, to provide a penetrating ray flaw detection system which is capable of detecting relatively small flaws in the presence of regular, expected, large and complicated internal physical variations in the object under inspection.

The above object is accomplished in accordance with the principles of the invention by arranging the two detectors relative to the object under examination such that each detector, at every point in time, views precisely the same transverse cross-sectional configuration of the object as does the other detector. By insuring this relationship, the comparison network is always balanced to provide a null indication, except when a flaw appears under one, but not both, of the detectors.

This is done by aligning the two detectors along a line of zero or minimum change in cross-sectional shape, or more specifically, along the direction of zero or minimum gradient in cross-sectional change. Consider an imaginary plane passing through the cylindrical star-holed test object which includes the longitudinal axis of the cylinder, or includes any other line within the cylinder parallel to the axis, and also includes the two detectors on one side of the test object and the penetrating ray source on the other side of the test object. Such a plane cuts through the diameter of a transverse circular cross-section of the cylinder if it includes the longitudinal axis of the cylinder, but will cut through such a cross-section as a chord if it includes a line parallel to, but other than, the axis. In any event, the two detectors are spaced relative to each other in the plane to define a line (two-detector line) which is also parallel to the longitudinal axis. The result of this arrangement is that parallel lines projected from the two detectors through respective cross-sections of the test object and in the imaginary plane described, will intercept, in their passage through the test object, precisely the same cross-sectional configurations. This remains true for whatever motion the cylindrical test object experiences as long as it is either translational motion or rotational motion about its longitudinal axis.

In contrast, should the detectors be aligned in any other plane, i.e., any plane at an angle other than parallel to the longitudinal axis of the cylinder, the two detectors, under most portions of the scan pattern, would simultaneously view different cross-sectional configurations, resulting in an imbalance and therefore an output from the comparison network. In these circumstances, the output from the comparison network during the scanning pattern is a complicated pattern (rather than a null) from which the detection and recognition of a flaw indication is extremely difficult, if not impossible under most circumstances.

In accordance with the invention, however, the two detectors aligned in the direction of zero or minimum gradient in test object cross-sectional change, view the same physical configuration at all times, except when a flaw passes in front of one of them.

The novel features which I believe to be characteristic of my apparatus and method invention are set forth with particularity in the appended claims. My invention itself, however, both as to its organization and operation, together with further objects and advantages thereof, may best be understood by reference to the following description taken in connection with the accompanying drawings.

In the drawings:

FIGURE 1 shows a preferred embodiment of the flaw detection system, in accordance with the principles of the invention, wherein a cylindrical test object is under inspection;

FIGURE 2 is a graph showing curves descriptive of the power output characteristics of the penetrating ray source used in FIGURE 1;

FIGURE 3 is a graph showing curves representative of the output voltages from each of the two balanced detectors of FIGURE 1;

Figure 7:
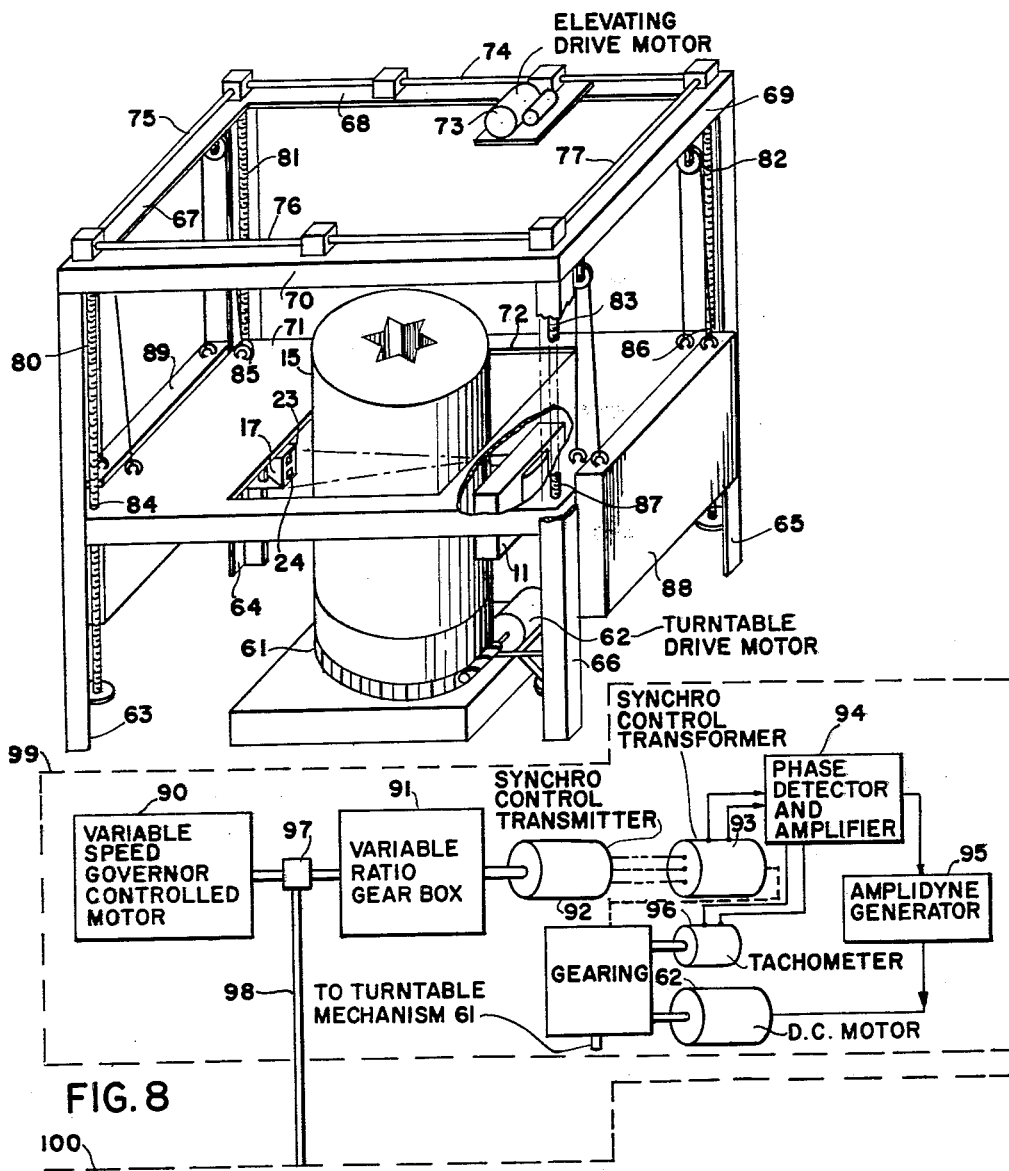
Figure 8:
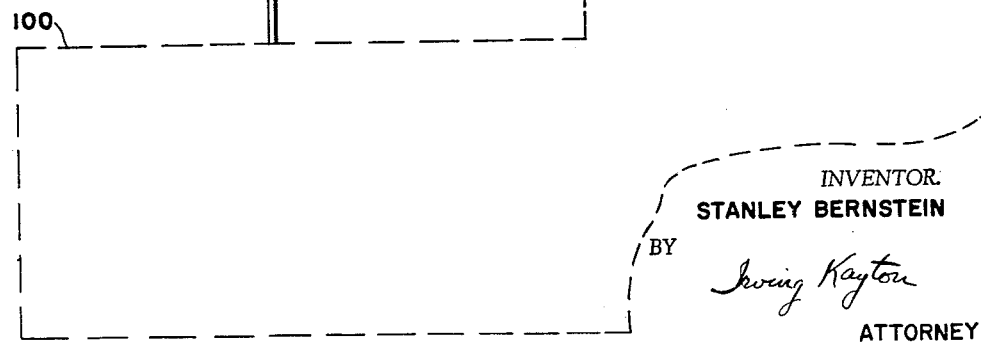

FIGURES 4A, B, C, D and E represent temporally successive positions and conditions of inspection of the cylindrical test object of FIGURE 1 subject to the scan pattern in accordance with the principles of the invention;

FIGURE 5A is a graph of the idealized output signal from the comparison network of FIGURE 1;

FIGURE 5B is a graph of the idealized output signal from solely one of the two balanced detectors of FIGURE 1;

FIGURES 6A and 6B are the same as FIGURES 5A and 5B respectively, except noise has been impressed on the curves;

FIGURES 7 and 8 show an example of an embodiment which may be used to move the cylindrical test object of FIGURE 1 on the one hand, and the detectors and penetrating ray source of FIGURE 1 on the other hand, relative to each other to provide the scan pattern of FIGURES 4A–E; and FIGURE 9 is another embodiment of flaw detection system in accordance with the principles of the invention.

Referring with greater detail to FIGURE 1, there is disclosed a preferred embodiment, shown for purposes of illustration, of a flaw detection system utilizing apparatus and the method in accordance with the invention. In this embodiment the object subject to flaw detection is one which is very large and has a complicated internal cross-section. It requires, therefore, a source of hard penetrating rays and detectors capable of sensing the hard rays that emerge from the penetrated test object. X-rays are the penetrating rays utilized in the embodiment of FIGURE 1 for the flaw detection function.

Considering FIGURE 1, then, there is disclosed a source of hard X-radiation, the betatron 11. Betatron 11 and its output window 12 are arranged such that a 15 degree conical beam 14 of X-radiation passes to the right. Immediately in front of output window 12 of betatron 11, is disposed an ionization chamber 13 such that substantially all of the output from window 12 passes through ionization chamber 13 and continues to the right. However, a small amount of X-radiation is monitored or detected by chamber 13 through the ionization caused within the chamber by the radiation. Ionization chamber 13 merely samples a minute portion of the output penetrating ray energy from betatron 11, and because of its location relative to the aperture 12, results in no shadow of the ionization chamber being cast by the penetrating ray energy in its progress to the right in FIGURE 1.

Disposed in the path of X-ray beam 14, is a test object 15 which is right cylindrical in shape, approximately five feet in diameter and twenty feet in length. Characteristically, this object may be the motor portion of a solid fuel ballistic missile. The disposition of rocket motor 15 is such that its longitudinal axis is vertical. Rocket motor 15 has disposed therein a six-pointed star aperture 16 which penetrates the entire vertical length of the internal section of cylinder 15. Star aperture 16 is a full length bore through the cylinder 15 and is co-axial therewith. Typically, the rocket motor portion 15 comprises a material which is of a rubbery or cheese-like consistency.

To penetrate so large and dense a test object and obtain useful information, the X-rays emanating from source 11 must have a high energy level. For this reason ordinary X-ray tubes are not satisfactory, and the higher output level betatron 11 is required. Typically, the output of betatron 11, which may be measured prior to its passage through test object 15 is capable of a 25 million electron volt level. A distribution curve 21 of the energy output of betatron 11 is shown in FIGURE 2, wherein the abscissa is the energy level in millions of electron volts and the ordinate represents the quantity of radiation or photon flux. Curve 22 represents the effective radiation which remains after beam 14 passes out of test object 15. These curves show that the lower energy level X-rays are absorbed by test object 15 and only very high energy level radiation is available at the output or right-hand side of the cylinder 15. Consequently, the detectors that receive X-radiation passing out from the test object 15 must be capable of operating at very high energy levels.

These detectors are distinguished from the ionization chamber 13 immediately at the output of betatron 11, in that relative to detector 13 it is necessary to have substantially all the radiation pass therethrough without disturbing the general pattern and distribution of X-ray beam 14. The function of the ionization chamber 13 in the overall system will be discussed after a general description of the entire arrangement of FIGURE 1 is presented. Consequently, for the purposes of the immediate discussion, the purpose and operation of ionization chamber 13 should be ignored.

Disposed to the right of rocket motor 15 and on the opposite side thereof from betatron 11, is a housing 17 which includes ionization chambers 18 and 19, with which the X-radiation 14, emerging from test object 15, communicates through two apertures 23 and 24, respectively. Housing 17 is preferably metal having a heavy atomic weight, such as lead, which effectively serves as a filter and attenuator for X-radiation. In this way, the only X-rays reaching the ionization chambers 18 and 19 do so through the apertures 23 and 24, respectively. Considering the general geometric relationship of the apertures 23-24, the ionization chambers 18-19, and the housing 17, it may be seen that the housing 17 is essentially a solid right parallelopiped with the apertures 23 and 24, in any transverse cross-section, having a rectangular shape. Apertures 23-24 are disposed vertically, one above each other, and are preferably dimensioned one inch vertically and one-half inch horizontally, with the most adjacent edges, 25 of aperture 23, and 26 of aperture 24, spaced from each other two inches. Apertures 23 and 24 extend to the right into housing 17, a distance of approximately eight inches.

The function of apertures 23 and 24 is to collimate the X-rays entering them after their exiting from the test object 15. The X-rays thus pass as parallel rays through the apertures and exit in that form at the right hand ends of the apertures. The length of the apertures and the distance from the X-ray source 11 results in the apertures properly functioning as collimators. To insure that the collimating function is properly performed, however, it may be desirable to include in the apertures X-ray collimating slits, sometimes referred to as Soller slits. These slits, which are well known in the art, comprise an array of thin lead sheets, or sheets of heavy atomic weight, which are spaced from each other and arrayed with their faces parallel to each other and to the direction in which the collimation is to be performed.

The collimation provided by apertures 23 and 24 results in parallel beam X-rays emerging at the right-hand ends of the apertures, and impinging on and passing into the ionization chambers 18 and 19 respectively. In a similar way, the function of the apertures 23 and 24 may be viewed in the reverse conceptually. Thus, a field of view, in the form of a small rectangular area, may be projected on to (and through) test object 15 from each of the apertures 23 and 24. In essence, then, the apertures 23 and 24 define a field of view on the surface of, and through the volume of, cylinder 15 in a manner such that the ionization chambers 18 and 19 can be visualized as looking on and through the test object 15 with the field defined by the shape of apertures 23 and 24.

The ionization chambers 18 and 19 are right cylinders. They are subjected to high X-ray energy levels, represented by curve 22 of FIGURE 2, having an effective radiation of approximately 10 million electron volts. They are, therefore, designed so as to sense a sufficient portion of this high energy X-radiation. Thus, the ionization chambers 18 and 19 are typically filled with xenon, which is one of the heavy atomic weight inert gases, at a pressure of ten atmospheres. The size, shape and pressure within the two ionization chambers are made as closely similar to each other as possible, so that the ionization chambers will be as closely balanced detectors as is possible. In all respects, except for the fact that they are designed to operate with such high energy level X-rays, the ionization chambers are typical ionization chambers known to those skilled in the art. These ionization chambers are cylindrical in shape, so as to sustain the ten atmosphere pressure of the enclosed xenon. Chambers of this type are available from the General Electric Company, X-Ray Department, Milwaukee, Wisconsin.

The electrical outputs of detectors 18 and 19 are connected to the preamplifiers 27 and 28, respectively. Amplifier 27, however, is adapted to provide an output voltage signal of opposite polarity to that of amplifier 28, in manner well known to those skilled in the art. Preamplifiers 27 and 28 are drift-compensated D.C. operational amplifiers, well known to those skilled in the art. The voltage outputs of amplifiers 27 and 28 are connected through scaling resistors 29 and 30, respectively, and thence through a balancing potentiometer 31 to a summing amplifier 32. Amplifier 32 has a feedback resistor which, in combination, performs the typical D.C. analog computer summing function. Resistors 29 and 30 are of equal values and perform the function of input scaling resistors to the summing amplifier 32.

Wiper 33 wipes across the potentiometer 31 and may be used to balance the signals received thereat from the scaling resistors 29 and 30. In this way, a null output may be insured from the summing amplifier 32 when the ionization chamber outputs are supposed to indicate a balanced condition or equal magnitude outputs. The output of the summing amplifier 32 is then fed, via conductor 34, to a typical two-channel recording device 35.

Test cylinder 15 is adapted to be moved, by means to be discussed in greater detail relative to FIGURES 7 and 8, in front of and past the vertically aligned apertures 23-24 in a manner now to be briefly described. The cylinder 15 is mounted on a horizontal turntable (not shown in FIGURE 1) in a manner such that it is rotated about its longitudinal axis. Additionally, the cylinder 15 moves vertically upwardly relative to apertures 23 and 24. Apertures 23 and 24 are aligned in a vertical plane which passes through the longitudinal axis of object 15 and through betatron 11 at its output aperture 12. In this way, the fields of view of cylinders 18-19, through apertures 23 and 24, are in the form of two small rectangles, one above the other, which penetrate diametrally through the rocket motor 15.

The vertically upward translational motion afforded the cylindrical test object 15 and the simultaneous rotational motion about object 15's longitudinal or vertical axis results in a helical scan of the rocket motor 15 by the apertures 23 and 24. More particularly, if the axis of aperture 23 is extended to the left to a point on the surface of cylinder 15, the combined relative translational and rotational motion of the cylinder would result in that point, affixed to the axis of aperture 23, describing a helix on the surface of the cylinder.

The internal geometry of cylinder 15 is such that variations in the internal configuration do not occur in a vertical direction, but only in a horizontal sense. Since the two detectors 18-19, and their cooperating apertures 23-24, are vertically aligned, they are on a line of zero gradient in cross-sectional change, i.e., from a point at the top of the object 15 to a point at the bottom of the object 15 in a direction parallel to the longitudinal axis thereof, there is no variation to be observed in the transverse cross-section as you move from one point to the other. Variations could only be observed along a line relative to the cylinder that has a non-vertical component of direction. Therefore, the apertures 23-24 literally view the same type of internal configuration at all times during the entire helical scanning pattern. Although in the embodiment of FIGURE 1 the apertures are aligned in a vertical plane which intersects the longitudinal axis of object 15 and the aperture 12 of betatron 11, they may also, if other circumstances indicate the desirability, be located on a plane which passes through the object to the right or to the left of the longitudinal center line of object 15. In this arrangement, even though the plane is "off-center" and forms a chordal, rather than diametral plane relative to the cross-section of object 15, both apertures nonetheless view precisely the same internal configuration for the same reasons as described immediately above. Furthermore, as long as the apertures are within the conical field of X-radiation projected from betatron 11, the functioning of the flaw detection system remains essentially the same as that described above.

Let us consider the operation of the embodiment of the FIGURE 1 with the test object 15 in a stationary condition. Betatron 11 projects a beam of X-rays 14 out through its aperture 12 (and which passes through detector 13 relatively unhampered and undisturbed) which has a photon flux versus energy distribution as represented by curve 21 of FIGURE 2. It passes through the motor 15 and in the process, the photon flux versus energy distribution of the X-ray beam changes as represented by the curve 22 of FIGURE 2A, which is the condition of the beam on emerging from the right-hand side of cylinder 15. The beam then enters the apertures 23 and 24 which, because of their identical size and geometry and because of their viewing precisely the same configurations of object 15, permit the entrance of substantially equal amounts of photon flux which in turn is sampled by the ionization chambers 18 and 19, respectively. The outputs of the ionization chambers 18 and 19 are amplified by preamplifiers 27 and 28, respectively. Because of the phase inversion provided by amplifier 27, the output voltages from the two amplifiers are added algebraically through the equal valued scaling resistors 29 and 30 and summing amplifier 32, to provide a null signal on conductor 34 and a null indication on recorder 35. The function of the potentiometer 31 as an input coupling to the summing amplifier 32 is to trim the input signal to insure a precise null output from the summing amplifier in case some imbalance in the ion chambers or apertures has occurred which is not otherwise subject to elimination. It should be noted that once potentiometer 31 is trimmed with wiper 33, the null indication will continue to remain a null, even if there is fluctuation in the photon flux output of the betatron 11, since each of ionization chambers 18 and 19 will experience precisely the same variation as the other. Thus, the fluctuation in betatron output is balanced out in the comparison network comprising the amplifiers 27–28, resistors 29, 30 and 31, and summing amplifier 32.

Let us now consider the operation of the embodiment of FIGURE 1 when the cylindrical object 15 is moved in front of the detector to provide the helical scan pattern described above. Assume the rotation and translation commences with the field of view through apertures 23 and 24 across the cylinder 15, as is shown in FIGURE 1, such that the view initially is in a plane including line 38, shown across the top cross-section of cylinder 15. In such an orientation, each aperture receives a minimum amount of penetrating ray energy, since line 38 passes through the maximum amount of material that can be interposed between betatron 11 and the detectors 18 and 19. In one complete rotation there is experienced six such maxima in terms of amount of matter interposed, or six minima in terms of the amount of penetrating ray energy reaching the detectors. These correspond to the six recessed points of the six-pointed star. There are also, for each complete rotation, six maxima of penetrating ray energy reaching the detectors corresponding to the six points of the star, since in those orientations the minimum amount of material is interposed between betatron 11 and the detectors 18–19.

Reference to FIGURE 3 shows curve 41 representative of the output from preamplifier 28 which is coupled from the output of ionization chamber 19, curve 42 shows the output from amplifier 27 which is, in turn, coupled from the output of ionization chamber 18. The distance along the abscissa represents one complete rotation of cylinder 15. The polarities of curves 41 and 42 are opposed, due to the phase inversion of amplifier 27. Since the two detectors are mounted vertically one above each other such that the line joining them is one along which no change in the internal configuration of the cylinder is experienced, at every instant of time, the ionization chambers 18 and 19 receive precisely the same amount of penetrating ray energy passing through the cylinder 15. Summation of the curves 41 and 42 (which is precisely what is done with the output of amplifiers 27 and 28 in the summing amplifier 32) results in curve 43. This is nothing more than a zero output or null signal which is effectively the signal recorded on the two-channel recorder 35 and applied thereto on conductor 34 from the output of summing amplifier 32. Thus, when there are no flaws in the test object the sum of two equal but opposite waveforms provides a null indication.

If a flaw exists and is viewed by one, but not both, of the apertures 23–24, however, the amount of X-radiation that reaches one of the two ionization chambers 18–19 is different from that for the other ionization chamber. This results in a variation in either curve 41 or curve 42, but not both, which in turn causes an imbalance; accordingly, a pulse or irregularity in curve 43 appears to indicate that a flaw exists.

From the curves of FIGURE 3, it may appear to the observer that information as to whether a flaw has passed in front of a detector may also be obtained by looking exclusively at one of the two curves 41 or 42; let us say, for example, curve 42. This is so because the regular pattern shown for one period corresponding to a complete rotation of cylinder 15 is quite regular, and would continue to be so with repeated rotations. One could assume, therefore, that if a flaw appeared in the cylinder, it would appear as a variation in the regularly recurring pattern of curve 42, for example. However, other possibilities for variation in the regularity of the curve 42 may well occur. For example, the output of betatron 11 may fluctuate in accordance with variations in line voltage and this would result in an irregularity in the pattern of curve 42. Curve 42 would therefore seem to indicate a flaw when in fact no flaw existed. This is due to the absence of a balancing of the output from amplifier 27 against another signal which includes the same kind of variation.

To help detect a flaw by looking at the output of solely one detector without getting a false indication because of variations in betatron output, the monitoring detector 13, mentioned before, is utilized. More specifically, ionization chamber 13 monitors the output of betatron 11. Detector 13 is in many respects similar to ionization chambers 18 and 19, but it is filled with one atmosphere of krypton rather than ten atmospheres of xenon, so that most of the radiation passes by undisturbed. The output of monitoring detector 13 is then applied to preamplifier 44, which amplifies the output of chamber 13 to a smaller extent than do the amplifiers 27 and 28 relative to ionization chambers 18 and 19. Furthermore, the output of preamplifier 44 is applied across potentiometer 45, so that a voltage appropriate to the level needed may be tapped off as desired. A potentiometer wiper is connected to a scaling resistor 46 having a resistive value equal to that of scaling resistor 47 in the output network of preamplifier 27. Both scaling resistors 46 and 47 act as inputs to the summing amplifier 48 through the balancing potentiometer 49. In this way the output of monitoring ionization chamber 13 is balanced against the output of the ionization chamber 18; the output from the comparison network formed by the amplifiers 44, 27, scaling resistors 46–47 and summing amplifier 48 is a signal much like curve 42 of FIGURE 3, but displaced upwardly since it is of smaller magnitude due to the subtractive signal provided by the monitoring detector 13. The output of summing amplifier 46 is then applied along conductor 51 to the two-channel recorder 35. In this way curve 43 of FIGURE 3 is applied to the recorder 35 on conductor 34, while curve 42, compensated, however, so that any variation in betatron output is neutralized, is applied to the two-channel recorder 35 along conductor 51.

Let us now consider the operation of the embodiment of FIGURE 1 in accordance with the principles of the invention, when a long, narrow and shallow flaw appears on the surface of the cylinder 15. Consider the series of FIGURES 4A through 4E for this purpose, with attention presently being directed to FIGURE 4A. Shown therein is a small portion of cylinder 15 with a flaw 40 in the form of a long scratch which may be several inches in length, and in any event, longer than the sum of the distance "X" between edges 25–26 of apertures 23 and 24, and the vertical length "a" of aperture 24. Flaw 40 may have a shallow depth, perhaps less than an inch, and a width of about .01 of an inch.

Disposed upon the surface of the portion of cylinder 15 shown in FIGURE 4A are projections of the apertures 23 and 24, as indicated. The distance X between the apertures, and the length $a$ of aperture 24, are parameters of considerable importance. In the embodiment of FIGURE 1, X is equal to two inches, and $a$ to one inch. The solid lines 47 and 48 are imaginary lines depicting the helical scanning pattern on that surface of the cylinder facing the detectors. The broken line 51 is that portion of the helical scan pattern represented on the opposite surface of cylinder 15, that is, on the side nearest betatron 11. The distance between lines 47 and 48, designated as "Y," is the pitch of the helix, i.e., the total translational or vertical distance that the cylinder travels for one complete rotation of the cylinder about its longitudinal axis. As required by the invention, and for reasons which will become more apparent shortly, the relationship of Y, X and $a$ is that Y is less than or equal to $2(X+a)$, i.e., $Y \leq 2(X+a)$.

Consider now the relationship of the flaw 40 to the projections of apertures 23 and 24 as cylinder 15 translates and rotates. The projections of apertures 23 and 24 should be considered stationary in space, and the translation and rotation of the cylinder 15 results in the flaw following the helical pattern represented by lines 47–49 and 51–52. The view presented in FIGURE 4A shows the leading edge of the flaw 40 having reached the lowermost edge of aperture 24, but not yet within the field of view of the aperture. Obviously, as the aperture passes along the helix, it will pass by the lowermost edge of the aperture 24 without intercepting the field of view of that aperture.

FIGURE 4B shows the situation after cylinder 15 has been rotated 180°. Flaw 40 is represented with broken lines to indicate that now it is on the far side of the cylinder from the detectors. The leading edge of flaw 40 has arrived along the dotted line 41 of the helix to a point just before the lowermost edge of aperture 23, and therefore does not intersect the field of view of aperture 23. However, the middle portion of flaw 40 now intercepts the view of aperture 24. This results, as shown in the curve of FIGURE 5A, in a positive-going pulse 54 due to the imbalance that results in the comparison network output from the two detectors.

FIGURE 4C shows the position resulting from an additional 180° rotation over that of FIGURE 4B, or one complete rotation from the position of FIGURE 4A. Here, flaw 40 intercepts the fields of view of both detectors 23 and 24. Consequently, there is no imbalance in the output comparison network of the two detectors (we are assuming that long, shallow flaw 40 is relatively uniform throughout its length). Accordingly, FIGURE 5A shows a null indication maintained at the point corresponding to the FIGURE 4C position, i.e., after one complete rotation of the cylinder.

With an additional 180° rotation as represented in FIGURE 4D, flaw 40 is once again on the far side of the cylinder. Now, however, its lagging end intercepts aperture 23, while the view of aperture 24 is completely free of any flaw. Consequently, an imbalance signal is once more generated; this results in a negative going pulse 55 in the curve of FIGURE 5A. The negative polarity is due to the fact that the output amplifier for aperture 23 is of opposite polarity from that for aperture 24.

And lastly, FIGURE 4E shows the cylinder rotated an additional 180°, i.e., two complete rotations beyond FIGURE 4A, so that flaw 40 is now completely beyond the fields of view of both the apertures, and of course FIGURE 5A indicates a null.

The curve of FIGURE 5B represents the monitor 13 compensated output from detector 18–aperture 23, which is applied from summing amplifier 48 to recorder 35 on conductor 51. This input to recorder 35 will hereinafter be referred to as the second channel while the curve of FIGURE 5A, representing the signal applied to recorder 35 on conductor 34, will be referred to as the first channel. FIGURE 5B is essentially the same curve as curve 42 of FIGURE 3. Now, however, a flaw is indicated by the pulse-like depression 56 in the curve of FIGURE 5B corresponding to the first channel pulse 55 of FIGURE 5A. Since FIGURE 5B and the second channel describe the output of detector 18 and not at all that of detector 19, there is no indication in the second channel corresponding to pulse 54 of FIGURE 5A which was due to the imbalance caused by detector 19.

The curves shown in FIGURES 5A and 5B are idealized versions of what would appear on the chart of the output recorder 35. If the entire system were free of noise, one could expect nice, smooth curves shown in these figures. As a practical matter, the noise generated in a system such as this results in indications that are similar to those represented in FIGURES 6A and 6B. These figures are merely the curves of FIGURES 5A and 5B changed to include a reasonable amount of noise for such a system. Clearly, the shallower or narrower the flaw, the more difficult will it be to distinguish pulses 54, 55 and 56, since the chance will be greater that they will be masked by noise.

It may now be understood how the relationship of Y being less than or equal to $2(X+a)$ prevents the undetected passage of any long, shallow and/or narrow flaws. Under this constraint, it is not possible for flaw 40 to simultaneously intersect the fields of view of apertures 23 and 24 without at some other time intersecting the field of view of aperture 24 alone, or 23 alone. In fact, the FIGURES 4A through 4E show the situation which is as close to being one wherein there is actual danger of a flaw going undetected without its actually happening, since in those figures $Y \leq 2(X+a)$. It may be noted that the leading edge of flaw 40 in FIGURE 4A just misses the field of view of aperture 24. After a 180° rotation as shown in FIGURE 4B, the leading edge of flaw 40 just misses the field of view of aperture 23 while the field of view of aperture 24 is intercepted. Obviously, if the pitch of the scanning helix is greater than that disclosed in these figures, the leading edge of flaw 40 would intercept the field of view of aperture 23 in FIGURE 4B, and both detectors would view the flaw with a concomitant null. Therefore, there would not be satisfied the necessary condition for the unambiguous detection of large flaws, i.e., no situation should develop wherein both detector fields of view are intercepted without the situation having first developed that solely one field of view is intercepted. In short, if the pitch Y were greater than the pitch shown in FIGURES 4A and 4B, the very first interception of either of the two fields of view would have occurred simultaneously with the interception of the other of the two fields of view.

Where the dimensions of the apertures are relatively small compared to the distance between the apertures, i.e., where $a$ is very much smaller than X, then the required expression simplifies to $Y \leq 2X$.

In the operation of the flaw detection system of FIGURE 1, the indication on the output recorder 35 of any kind of flaw at all is a signal to the operator to stop the process completely and to take a radiographic picture of that portion of the test object to ascertain precisely the size, shape and nature of the flaw previously detected. Some types of flaws may be acceptable, while others may not. Where such a radiographic procedure is followed, the second channel of FIGURE 1 and all its related equipment and circuitry may be dispensed with. It may be recalled that reference to a second channel (i.e., the output of one of two balanced detectors) may have proved helpful in a prior art two-balanced detector system, since a large flaw may have gone undetected in the prior art system if the flaw was of the type that would simultaneously intercept both detector fields of view without having intercepted, at some other time, the field of view of solely one detector. Under those circumstances, reference to the single detector output might have indicated the existence of the large flaw if it had not been too shallow and/or narrow a flaw. If it was too shallow and/or narrow, the indication would not show above the noise level in the single detector output.

Now, however, in accordance with the principles of the invention, it is no longer possible for a flaw to go undetected merely because it simultaneously intercepts the fields of view of both apertures without at some other time intercepting the field of view of solely one. Accordingly, the ambiguity is removed and reference need not necessarily be made to a single detector (the second channel of FIGURE 1). Accordingly, the second channel with its related monitoring circuitry may be eliminated if desired. This may be particularly appropriate when the procedure is followed wherein a radiograph is taken of the test object responsive to a first channel when there has been a flaw indication. However, the conservative approach may be indicated under some circumstances; then both channels should be retained since redundant information may be useful, if only for the purpose of verification.

The relative motion between cylindrical test object 15 and detectors 18–19 and betatron 11 needed to satisfy the requirements described above, may be accomplished in several ways. For example, it may be desirable to move the object 15 rotationally about its longitudinal axis while simultaneously moving the detectors and the betatron translationally relative to the cylinder. Alternatively, the detectors and betatron may be rotated about the cylinder while he cylinder is moved translationally parallel to its axis; or the cylinder itself may be subjected to both longitudinal and rotational motion, or similarly for the detectors and betatron.

In any event, the two components of relative motion result in the required helical scan pattern, and may be constrained in accordance with the principles of the invention described above. One system for producing such motion will now be described. It is one wherein the cylindrical object is rotated about its longitudinal axis upon a turntable while the detectors and betatron are moved translationally relative to the object.

Consider now the system of the embodiment represented in FIGURE 7. The cylindrical rocket motor 15 is mounted with its longitudinal axis in a vertical position upon a turntable mechanism 61. This turntable is driven, through appropriate gearing, by a D.C. motor 62. The D.C. motor is in turn controlled by circuitry to be described in greater detail hereinafter. Surrounding and disposed above rocket motor 15 is a superstructure having four vertical legs 63–66 at the top of which are disposed four horizontal beam members connecting the upper ends of legs 63–66 to form a rectangular frame. Located below and parallel to the horizontal frame formed by members 67–70 is a horizontally disposed but vertically movable platform 71 having an opening 72 therein, and disposed relative to rocket motor 15 such that the vertical motion of platform 71 may occur with rocket motor 15 passing freely within opening 72.

Mounted and secured to the lower portion of platform 71 is detector housing 17 (of FIGURE 1) showing the detector apertures 23 and 24, and also betatron 11. Betatron 11 and detector housing 17 are secured to platform 71 so as to maintain the relationship to each other and to rocket motor 15 as disclosed and described relative to FIGURE 1.

Platform 71 is rendered vertically movable in the manner now to be described. An elevating D.C. drive motor 73 is mounted upon horizontal member 68 and engages drive shaft 74, which in turn, through gearing drives related drive shafts 75, 76 and 77, mounted upon horizontal members 67, 70 and 69, respectively. Through appropriate gearing, the drive shafts drive four vertical lead screws 80, 81, 82 and 83, which are disposed adjacent to and parallel with vertical legs 63–66, respectively. Four lead screws 80–83 are threaded through the four corners of movable platform 71 through threaded apertures 84–87, respectively. Two counterweights 88 and 89 are secured to movable platform 71 through wire tackle over blocks appropriately disposed.

In operation then, turntable mechanism 61 is driven at a steady rate of turntable drive motor 62. In this way, rocket motor 15 rotates in place at a steady rate of rotation. Simutlaneously, detector housing 17 and betatron 11 are moved vertically upwardly (or downwardly, as desired) relative to rocket motor 15 by virtue of D.C. elevating drive motor 73 actuating drive shafts 74–77, which in turn couple to four lead screws 80–83 driving movable platform 71 (and aided by counterweights 88–89). The rate of vertical movement of the platform, and therefore of the betatron and detectors, is controlled by the speed of elevating drive motor 71. This speed is fixed relative to the gearing and to the rate of rotation of turntable 61 such that the vertical movement of platform 71 during a single complete rotation of turntable 61 is less than, or equal to, twice the sum of the spacing between apertures 23–24 plus the vertical length of one of the apertures.

In order to assure a steady and reliable turning rate, and to be able to constrain the vertical and rotational motion in accordance with the requirements of the invention, an efficiently controllable and sensitive driving circuit is required. Such a circuit is disclosed in FIGURE 8. This figure is a diagram of an appropriate turntable drive system. Shown within broken line box 99 is a variable speed, governor controlled motor 90 connected to drive variable ratio gear box 91, whose output shaft drives synchro control transmitter 92. The output leads of the synchro travel to synchro controlled receiver and transformer 93 which may be mounted closely adjacent to D.C. turntable drive motor 62 (shown both in FIGURE 8 and at the bottom of FIGURE 7). The output of the synchro transformer is coupled to amplifier and phase detector 94 whose output, in turn, is coupled to amplidyne generator 95 which directly drives D.C. motor 62. Motor 62, in turn, through appropriate gearing, drives turntable mechanism 61. Geared off the drive shaft driven by motor 62 is the synchro transformer 93 whose output is fed back, as part of a feedback loop, to phase detector and amplifier 94. In this way, the speed of the D.C. motor may be compared with the rate of variable speed motor 90 as transmitted to synchro transformer 93 to insure that there is no rate error, and if a rate error is generated, a correction signal may be immediately applied to amplidyne generator 95. The tachometer 96 is driven off the gearing of the drive shaft of motor 62 and has its output coupled to detector 94 ot insure servo stabilization.

It may be readily understood that the same circuit may be used for driving elevating drive motor 73. Appropriate gearing 97 may be used to take the mechanical output of variable speed motor 90 and apply it via shaft 98 to another variable ratio gear box to then drive the same circuitry as shown in FIGURE 8, but with the output applied to drive 73. Shaft 98 is shown coupled to empty broken line box 100 whose contents would accordingly be the same as that of box 99. By appropriately selecting the gear ratio in gear box 91 and the gear ratio to be used in the elevating drive mechanism, the required relationship of pitch to aperture spacing may be readily obtained, in accordance with the principles of the invention.

The principles of the invention are equally applicable to less complicated test structures than rocket motors. FIGURE 9 discloses an embodiment, given for purposes of illustration, in accordance with the principles of the invention, wherein test object 101 is a flat metal sheet which may, for example, be part of a production line or the product of a rolling mill. Metal sheet 101 may be on its way from having been rolled into its indicated shape. In order to detect flaws in this sheet of metal, X-ray tube 102 is disposed above test sheet 101, such that X-radiation from tube 102 passes vertically downwardly at right angles to the plane of object 101. In this embodiment, an ordinary X-ray tube is used, rather than the betatron of FIGURE 1, since the test object is relatively thin and accordingly does not require the use of such hard X-radiation for transmission therethrough.

X-ray tube 102 is mounted at one end of a U-shaped beam structure. At the other end of the U, disposed beneath test sheet 101, housing 104 is supported. Housing 104 is in all respects similar to housing 17 of FIGURE 1. However, within housing 104 there are disposed two ionization chambers of construction like that of ionization chamber 13, rather than like ionization chambers 18 and 19 of FIGURE 1. This is because the ionization chambers of FIGURE 9 need not cope with radiation that is at as high an energy level as was required for detectors 18 and 19. Two apertures 105 and 106 are disposed in housing 104, which are the counterparts of apertures 23 and 24 of FIGURE 1.

Test sheet 101, as part of the production line movement, is caused to move translationally between tube 102 and housing 104. Simultaneously, means (not shown) may be applied to U-shaped support member 103 to move it transversely back and forth relative to sheet 101. In this way, the scanning pattern traced out relative to sheet 101 is as shown in broken curve 107. Thus, this scan pattern has a component of motion parallel to the two-detector line, i.e., a line between apertures 105 and 106, and a cyclical component at right angles to the two-detector line. The length of the cycle is as indicated on curve 107 between points 108 and 109. For every complete cycle, sheet 101 moves a translational amount parallel to the two-detector line, equal to the distance Y between 108 and 109. Under these circumstances, Y corresponds to the pitch of the helical scan pattern of the embodiment of FIGURE 1. With the quantities $X$ and $a$ referring to the same dimensions on housing 104 as they did on housing 17 of FIGURE 1, it may be seen that the basic relationship of $Y \leq 2(X+a)$ holds in this situation also.

The transverse motion of the detectors and X-ray tube 102 on U-beam 103 may be supplied by an electromechanical drive system substantially the same as system 99 presented in FIGURE 8. Additionally, however, a cam may be introduced into the system so as to reverse the direction of motion of U-beam 103 each time the detectors and tube reach the left and right hand edges of test sheet 101, respectively.

While I have shown particular embodiments and methods of my invention, it will be understood that many modifications may be made without departing from the spirit thereof, and I contemplate by the appended claims to cover any such modifications as fall within the true spirit and scope of my invention.

What I claim is:

1. A flaw detection system comprising: a source of penetrating ray energy; means for supporting an object to be inspected for flaws; two penetrating ray detectors, said detectors being disposed relative to said source and to said support means such that said inspection object when mounted on said support means in interposed between said source and said detectors, whereby each of said detectors has an effective field of view on and through said inspection object; said detectors being spaced from each other along an imaginary line hereinafter referred to as the two-detector line; means for providing relative motion between said inspection object and said detectors having a translational component of motion parallel to said two-detector line and a cyclical component of motion in a plane perpendicular to said two-detector line; said relative motion providing means including means for constraining said translational component of motion to a magnitude equal to or less than twice the sum of the distance between the fields of view of said two detectors in the direction of said two-detector line and the length of said field of view in the direction parallel to said two-detector line, during each complete cycle of said cyclical component of motion; whereby no flaw in said inspection object can at any point in time simultaneously intercept the fields of view of both detectors without intercepting the field of view of solely one of said detectors at some other point in time.

2. A flaw detection system comprising: a source of penetrating ray energy; a cylindrical test object disposed with its longitudinal axis perpendicular to the axis of the path of penetrating ray energy from said source; two penetrating ray detectors disposed on opposite sides of said cylinder from said source, said detectors being spaced from each other along a line parallel to said longitudinal axis of said cylinder and within the path of ray energy passing from said source out from said cylinder so that each of said detectors effectively has a field of view on and through said cylinder; the bounds of said fields of view being spaced from each other at their most closely adjacent edges by a distance $X$ in the direction parallel to said longitudinal axis, one of said fields of view having a dimension $a$ parallel to said longitudinal axis; means for moving said cylinder and said detectors relative to each other to define a helical scanning pattern of said cylinder by said detectors; and means for constraining said relative motion to satisfy the relationship:

$$Y \leq 2(X+a)$$

where $Y$ is the pitch of the helix defined by said helical scanning pattern.

3. A flaw detection system comprising: a source of X-rays; means for supporting a large cylindrical test object relative to said source of X-rays such that X-rays emanating from said source penetrate and pass through the cylindrical test object supported by said means; two ionization chambers disposed on the opposite side of said cylindrical test object from said X-ray source, said chambers being spaced from each other along a line parallel to the longitudinal axis of said cylindrical test object; X-ray collimating means interposed in the path of said X-rays between said cylindrical test object and each of said ionization chambers whereby a parallel beam of rays enters each of said ionization chambers and each of said ionization chambers thereby effectively has a field of view on and through said cylindrical test object; said fields of view being spaced from each other a distance $X$ between the most closely adjacent edges of said fields of view along a line parallel to said longitudinal axis of said cylindrical test object with each of said fields of view having a length $a$ in said same direction; means for providing translational and rotational motion between said cylindrical test object and said ionization chambers to define a helical scanning pattern of said cylindrical test object by said ionization chambers in that a point projected from one ionization chamber in a direction perpendicular to said longitudinal axis and on to the surface of said cylinder describes a helix having a pitch $Y$ as a result of said relative rotational and translational motion; and control means included in said relative motion means for constraining said motion to satisfy the expression: $Y \leq 2(X+a)$.

4. Flaw detection apparatus as recited in claim 3 including: circuit means coupled to the output of each of said ionization chambers for deriving a difference quantity commensurate with the difference in magnitudes between said outputs of said ionization chambers and recording means responsive to said circuit means for recording said difference quantity on a first channel thereof.

5. Flaw detection means as recited in claim 4 including: a third ionization chamber interposed between said X-ray source and said test object so as to directly monitor the output of said source; a second circuit means coupled to the output of said third ionization chamber and the output of one but not both of said two ionization chambers for deriving a second difference quantity commensurate with the difference in magnitudes between said third chamber output and said one chamber output, the output of said second circuit means being coupled to said recording means for recording said second difference quantity on a second channel of said recording means.

References Cited by the Examiner

UNITED STATES PATENTS

| | | | |
|---|---|---|---|
| 2,094,318 | 9/37 | Failla | 250—83.6 |
| 2,097,760 | 11/37 | Failla | 313—93 X |
| 2,525,292 | 10/50 | Fua | 250—83.4 |
| 2,885,557 | 5/59 | Kizaur | 250—83.4 |
| 2,928,947 | 3/60 | Cherry | 250—52 |
| 2,983,819 | 5/61 | Bigelow | 250—83.4 |

FOREIGN PATENTS 567,280  2/45  Great Britain.

RALPH NILSON, *Primary Examiner.*

ARTHUR GAUSS, JAMES W. LAWRENCE,
*Examiners.*